United States Patent

Euchner

[15] 3,663,882

[45] May 16, 1972

[54] HARMONIC GENERATOR

[72] Inventor: William Henry Euchner, San Carlos, Calif.

[73] Assignee: Farinon Electric, San Carlos, Calif.

[22] Filed: July 13, 1970

[21] Appl. No.: 54,093

[52] U.S. Cl. ................................328/33, 307/240, 307/241, 307/261, 307/271, 328/65

[51] Int. Cl. ..........................................................H03k 5/08

[58] Field of Search..................307/239, 240, 241, 243, 244, 307/246, 255, 261, 270, 271, 282, 313; 328/33, 65, 66

[56] References Cited

UNITED STATES PATENTS

| | | | |
|---|---|---|---|
| 2,938,174 | 5/1960 | Bulleyment | 307/241 X |
| 3,281,073 | 10/1966 | Chou et al | 307/239 X |
| 3,466,468 | 9/1969 | Bartlett et al. | 328/65 X |
| 3,007,103 | 10/1961 | Ehret | 307/313 X |
| 3,018,381 | 1/1962 | Carroll et al. | 328/140 X |
| 3,086,129 | 4/1963 | Kelley, Jr. et al. | 307/270 X |
| 3,245,004 | 4/1966 | Andersen et al. | 307/271 X |
| 3,309,605 | 3/1967 | Hoven | 307/261 X |
| 3,535,556 | 10/1970 | Hall | 307/240 X |

FOREIGN PATENTS OR APPLICATIONS

| | | | |
|---|---|---|---|
| 957,491 | 5/1964 | Great Britain | 307/261 |

*Primary Examiner*—Stanley T. Krawczewicz
*Attorney*—Flehr, Hohbach, Test, Albritton & Herbert

[57] ABSTRACT

A harmonic generator in which a sinewave input signal drives a pulse generator whose output is applied to the mid-point of the primary of a transformer. Switching means are connected to opposite ends of the primary and operate such that unipolar pulses applied to the mid-point flow alternately in opposite halves of the transformer. The output from the secondary of the transformer is a bipolar pulse train having a high odd harmonic content.

2 Claims, 2 Drawing Figures

WILLIAM H. EUCHNER JR.
INVENTOR.

BY Flehr, Hohbach, Test, Albritton and Herbert
ATTORNEYS

HARMONIC GENERATOR

BACKGROUND OF THE INVENTION

This invention relates generally to a harmonic generator and more particularly to a harmonic generator providing bipolar pulses having a high order odd harmonic content.

In connection with frequency division multiplex radio communication systems, it is often necessary to provide a plurality of subcarriers which are odd harmonics of the reference carrier or signal. In the past, the subcarriers have been derived by amplifying the reference carrier, filtering and driving a saturable reactor to obtain the desired harmonic frequency. The amplitude of the harmonic signals is low requiring additional amplification introducing distortion and level instability. The prior art circuits are also temperature sensitive and require tuning to reduce unwanted harmonics.

OBJECTS AND SUMMARY OF THE INVENTION

It is a general object of the present invention to provide a pulse generator which accepts sinewave input signals of predetermined frequency and provides an amplitude balanced bipolar pulse train having a high order odd harmonic content at the same frequency.

The foregoing and other objects are achieved by a harmonic generator which includes a pulse generator adapted to receive an input signal and provide unipolar output pulses, a center tapped transformer which receives said pulses at its center tap and switching means connected to the ends of the transformer serving to alternately cause pulses to flow in opposite legs of the transformer whereby a bipolar output pulse train appears at the secondary of the transformer.

DESCRIPTION OF THE PREFERRED EMBODIMENT

Figure 1:
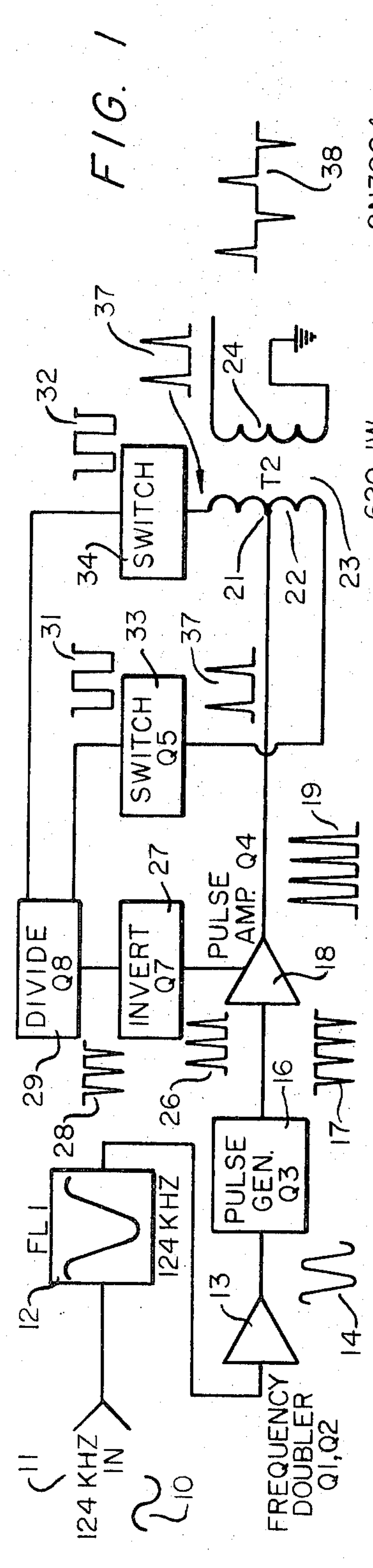
FIG. 1 is a block diagram of a harmonic generator in accordance with the present invention.

Referring to FIG. 1, there is shown a block diagram of a harmonic generator in accordance with the invention with typical waveforms shown at various portions of the circuit.

The input 11 is adapted to receive an input signal 10 which is filtered by filter 12 to assure that the fundamental component is applied to frequency doubler 13 which provides an output sinewave signal 14 having double the frequency of the input signal 10. The sinewave signal 14 is applied to a pulse generator 16 which generates a train of unipolar pulses 17. The pulses 17 are applied to an amplifier 18 which amplifies and inverts the pulses, pulse train 19. The output of the amplifier 18 is applied to the center tap 21 of the primary 22 of transformer 23. The secondary of the transformer 24 provides a bipolar output signal, as will be presently apparent.

The inverted signal from the pulse amplifier 18 is also shown at 26 and is applied to an inverter 27 and thence to a divider circuit 29 providing two pulse trains 31 and 32 at half the frequency of the pulses 28 and 180° phase relationship. These pulses serve to operate switches 33 and 34, respectively, which are connected to opposite ends of the transformer primary. The switches cause the pulses 19 to flow alternately through the two halves of the transformer as shown at 36 and 37, respectively.

The output of the secondary of the transformer is then a series of bipolar pulses 38. The resultant pulses 38 have double the frequency of the input signal. The bipolar pulses will be substantially of equal amplitude since they are derived from the unipolar pulse train 19 with alternate pulses inverted at the output of the transformer 23.

Figure 2:
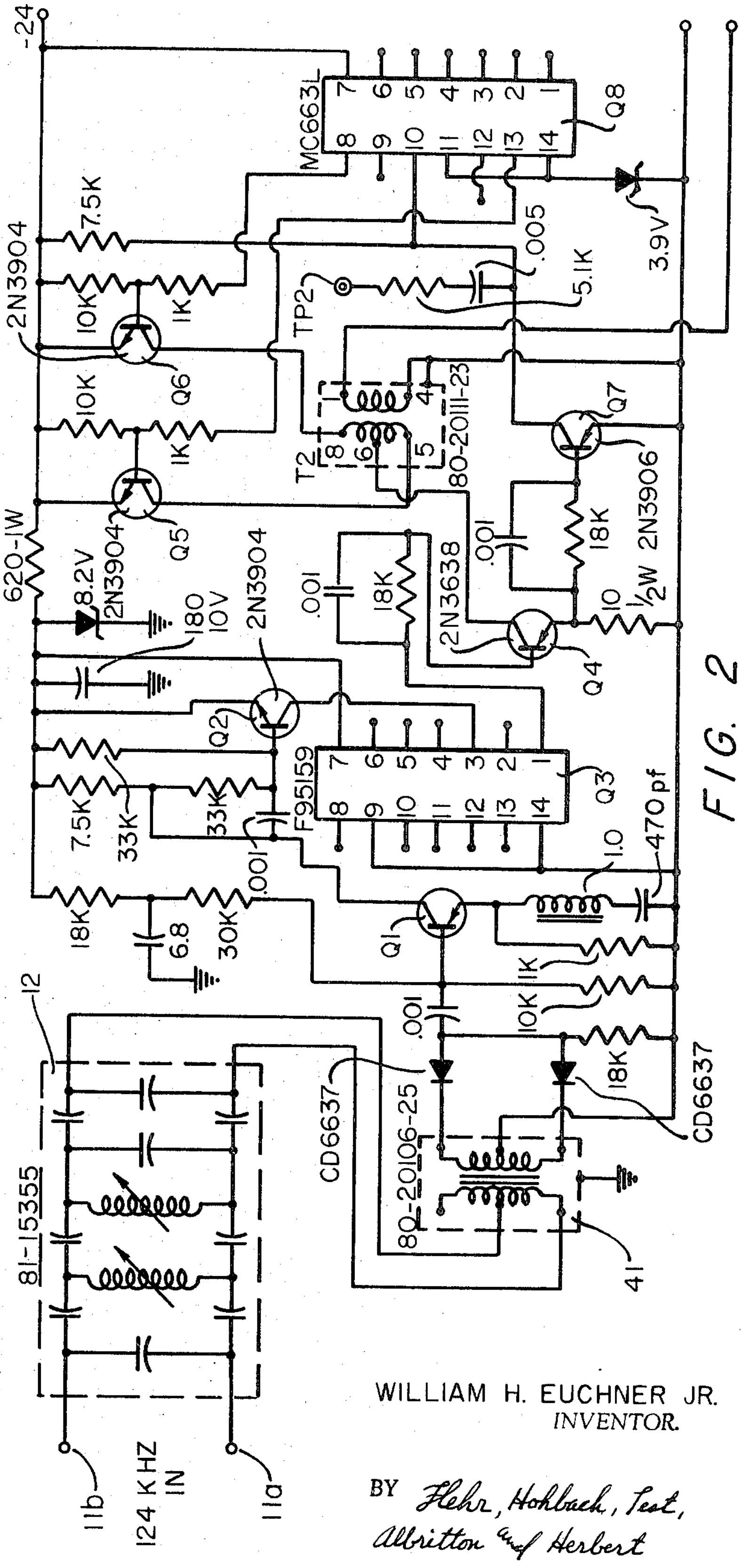
FIG. 2 is a schematic circuit diagram of the harmonic generator shown in FIG. 1.

A detailed circuit diagram of the harmonic generator is shown at FIG. 2. The sinewave pulses are applied at the terminals 11*a*, 11*b*, and thence to a filter 12 comprising capacitances and inductances arranged in a filter network. The output of the filter is applied to the primary of a transformer 41. The secondary of the transformer provides an unbalanced source for the frequency doubler and amplifier comprising the transistors Q1 and Q2, and associated components. The signal from the transistor Q2 drives an integrated circuit pulse generator Q3 which produces a train of negative pulses. These pulses are amplified and inverted by the transistor Q7 and are used to drive the integrated circuit frequency divider Q8. Each output of divider Q8 is a squarewave at the input frequency. One output is delayed one-half cycle with respect to the other output. The two signals (pins 8 and 13) go to the bases of transistor switches Q5 and Q6, respectively. Q5's collector connects to one primary terminal of the transformer 23 and the collector of the other transistor connects to the other primary terminal. Transistors Q5 and Q6 conduct alternately providing return paths for pulses applied to the center tap. Signals induced in the secondary 24 of the transformer are at double the input frequency of the switching signal rate and are bipolar pulses having a high harmonic content.

In one particular example, a circuit was constructed as shown in FIG. 2 with the components and component values indicated. The input signal was a 124 hKz sinewave at a level of 0.7 volts rms with an input impedance of 1600 ohms. The output impedance was 5° ohms. The output pulses 38 had an amplitude of 36 volts peak to peak and a pulse width of 0.2 microseconds.

I claim:

1. A harmonic generator including a pulse generator adapted to receive an input alternating signal of predetermined frequency and provide unipolar output pulses, a transformer having primary and secondary windings with said primary winding being center tapped, the center tap of said primary winding being connected to receive said unipolar output pulses, switch means connected to each end of said transformer and being controlled by said unipolar output pulses to alternately direct unipolar output pulses applied to the center tap through opposite ends of the primary whereby bipolar pulses of substantially equal amplitude are induced in the secondary of the transformer.

2. A harmonic generator as in claim 1 wherein said means for controlling said switch means comprises a divider which receives said unipolar output pulses and provides output pulse trains having a 180° phase relationship with respect to one another for driving the switch means.

* * * * *